May 21, 1963 B. GRÜTER 3,090,336
SPIRAL PIPE WELDING MACHINE
Filed April 28, 1959 3 Sheets-Sheet 1

INVENTOR.
Bernhard Grüter
BY Michael S. Striker
Attorney

May 21, 1963   B. GRÜTER   3,090,336
SPIRAL PIPE WELDING MACHINE
Filed April 28, 1959   3 Sheets-Sheet 3

INVENTOR.
Bernhard Grüter
BY Michael S. Striker
Attorney

United States Patent Office 3,090,336
Patented May 21, 1963

3,090,336
SPIRAL PIPE WELDING MACHINE
Bernhard Grüter, 100 Gutstrasse, Zurich, Switzerland
Filed Apr. 28, 1959, Ser. No. 809,542
Claims priority, application Switzerland May 2, 1958
3 Claims. (Cl. 113—35)

The present invention relates to spiral pipe welding machines for the manufacture of cylindrical or conical pipes formed of substantially endless metal strips.

A number of spiral pipe welding machines for the manufacture of spirally welded tubes or pipes is already known. By way of example, a device is known in which a band or strip is wound spirally on a continuously rotating mandrel in such a manner that the lateral edges of the band contact one another and then are welded together. This device possesses several disadvantages. In the first place it is comparatively difficult to obtain a good welding seam between the strips located on the mandrel. Furthermore, it is difficult to change over units of this kind from one pipe size to another since the complete mandrel and the members surrounding the mandrel which force the band against the latter must be exchanged. Finally, these devices having a rotating mandrel are costly and complex since they are necessarily equipped with a substantial number of moving parts.

Other known devices for the manufacture of spirally welded tubes are designed to insert the band into a stationary shaping mechanism. This shaping mechanism may contain several rotatable rolls which engage the outside of the band so as to deflect it. The feeding device supplies the band towards the rolls which cause the band to be curved. These devices are disadvantageous for the following reason. The band is known to require oblique insertion in the shaping mechanism so that the edges of the band will abut in such a manner that a spirally or helically wound tube is produced. On the one hand the band must be bent by the rolls on insertion into the shaping mechanism while it is laterally displaced relative to these rolls on the other. The stationary rolls are therefore called upon to take two simultaneous movements, i.e. the rotation of the tube being formed and the axial displacement of this tube. The rolls can however take up only one movement, by way of example the rotation of the tube being formed, while the other movement will result in friction between the rolls on the one hand and the band and, respectively, the tube on the other. It is readily appreciated that the rolls cannot in the present case perform their function—to prevent sliding friction—since such sliding friction will always occur irrespective of the arrangement of these rolls. The rolls will therefore wear fairly rapidly, which detrimentally affects the economical operation of such devices. In addition, these devices, too, are difficult to change over from one tube size to another.

Yet other devices for the manufacture of spirally welded tubes have become known in which a feed unit, such as power driven rolls, insert the band in a shaping mechanism comprising two concentrically arranged tubes which shape the band inserted spirally and, respectively, helically into a tube. Devices of this type have not proved to be useful because substantial frictional resistance is caused between the tubes and the band, which can damage the band on the one hand, and considerably increase the driving power required to feed the band on the other. These devices, too, can be changed over from one tube size to another with difficulty only since the two shaping tubes must be changed for the purpose. In addition, the shaping tubes are subject to substantial wear and tear. A further disadvantage of this type of installations for the manufacture of spirally welded tubes is that the welding station is accessible with difficulty only and that welding becomes awkward particularly because the tubes being formed must be prevented from reaching welding temperature.

The present invention therefore has for its object to provide a device for the manufacture of spirally welded tubes which is free from the above-cited disadvantages.

A further object of this invention is to provide a device of the type described in which the frictional forces between the band to be spirally shaped and the shaping mechanism are very low so that correspondingly small forces by comparison are required to supply the band into the shaping mechanism.

Yet a further object of the present invention is to provide a device of the type described in which the welding station is easily accessible and in which the shaping members can readily be exchanged so that the device can be changed over from one tube size to another without any difficulty.

A further object of this invention is to provide a device for the manufacture of spirally welded tubes in which only a few members of the shaping mechanism are subject to wear, these parts being readily replaceable.

The present invention relates to a device for the manufacture of spirally welded tubes of the type described and is characterized by the fact that the shaping mechanism is provided with at least two guides arranged at a distance corresponding to the thickness of the band, the said guides taking up between them the band supplied by a driving unit and the said guides being arranged, immediately adjacent to the driving unit, linearly and parallel with one another and subsequently helically and inserted in one another.

The invention will be described in greater detail in conjunction with the attached drawings in which.

Figures 1, 2:
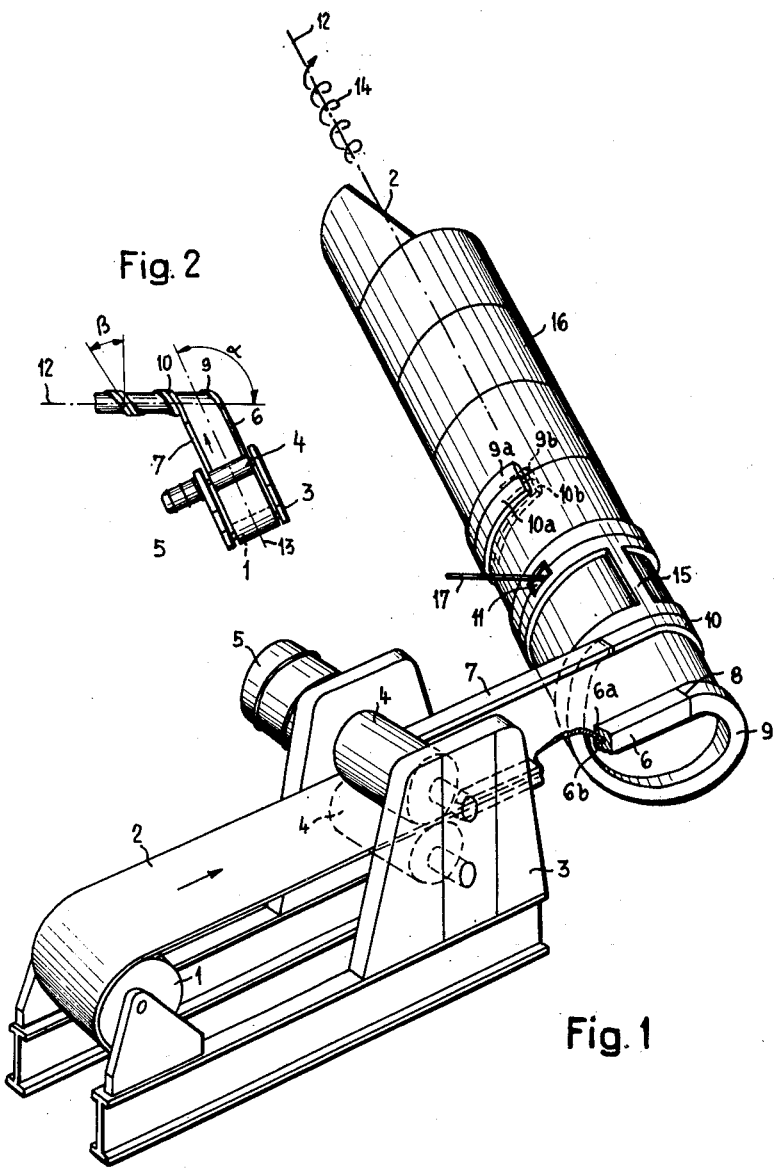
FIG. 1 is a perspective view of the device for the manufacture of spirally welded cylindrical tubes.
FIG. 2 is a plan view of a portion of the device according to FIG. 1 at a reduced scale.

In the device according to FIG. 1, two supporting rails accommodate a reel 1 on which the band 2 is wound, and a transporting or driving means 3, the driving means 3 comprises two rolls 4 which are driven by an infinitely variable motor 5. The band 2 passes between the two rolls 4 and is thereby wound off the reel 1 by the motor 5 and inserted in the shaping mechanism arranged beyond the rolls. The shaping mechanism contains U-shaped guides 6 and 7 so arranged that the band 2 can be passed between them. The U-shaped guides 6 and 7 each having a pair of parallel legs respectively adapted to engage edge portions of the band 2 at the inner and outer surface thereof and forming respectively inner and outer guide rails, whereas the bases of the U-shaped guides are adapted to abut against lateral edge faces of the band 2 and form abutment means, the legs 6a and 6b of the U-shaped guide 6 being visible in FIG. 1. The U-shaped guides 6 and 7 are disposed linearly and parallel with one another from the rolls 4 to a point of separation 8. Arranged from the point 8 are helically bent guides 9 and 10 which follow upon the guides 6 and 7 and are removably attached to the latter by means not shown. The curvature of the guides 9 and 10 is such as to enable the band to be helically or spirally shaped into a tube having the desired tube diameter. The axis 12 (FIG. 2) of the helically bent guides 9 and 10 forms an obtuse angle $\alpha$ with a straight line 13 intersecting the axis 12 and disposed parallel with the guides 6, 7. The angle $\alpha$ is so dimensioned that the helical separating line or welding seam is disposed at a pitch corresponding to the width of the band, i.e. the angle $\alpha$ is equal to the pitch angle $\beta$ plus 90°.

The rolls 4 driven by the motor 5 pull the band 2 from the reel 1 and force it between the guides 6, 7. The subsequent guides 9, 10 bend the band which passes in such a manner that a continuous tube 16 is formed. The joints between the coil edges is welded through an opening 11 by means of resistance, inert-gas arc or unionmelt process. The reference numeral 17 designates a diagrammatically indicated welding rod. The continuous supply of the band 2 causes the tube 16 to perform a helical movement 14. In order to cause the tube 16 to perform this movement, the guides 9 and 10 of the present embodiment are designed as a closed U-type section for the first helical revolution. From the second revolution to the end of the guides, only the two section legs are provided for the bend as guides 9a, 9b, 10a, 10b, i.e. the band 2 has its side edges enclosed between four flat members. The guide rails 9a, 10a adapted to engage outer surface portions of the strip 2 or 9b, 10b adapted to engage inner surface portions of the strip 2 may be interconnected by webs 15. After the tube 16 is welded, it is guided by the rails 9a, 9b, 10a, 10b for some distance until the welding seam has solidified. This provision eliminates particularly the heat cracks otherwise common. The legs of the guides 6, 7, 9 and 10 adapted to engage outer surface portions of the strip 2 constitute outer guide rail means and the legs of these guides adapted to engage inner surface portions constitute inner guide rail means and the legs of the guides 6, 7 form respectively inlet portions of said guide rail means, whereas the legs of the guides 9 and 10 form respectively the helical forming portions thereof.

Figure 3:
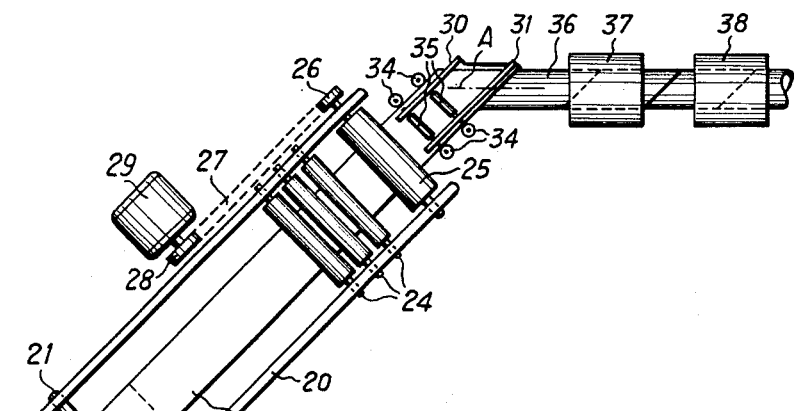
FIG. 3 is a plan view of a further device for the manufacture of spirally welded cylindrical tubes.

FIG. 3 shows a somewhat modified device for the manufacture of spirally welded cylindrical tubes. Rotatably arranged at one end of a U-type supporting frame 20 by means of a shaft 21 is the reel 22 with the band 23 wound on it. Along the two legs of the supporting frame extend three pairs of guiding rolls 24 designed to guide the band 23, the top guiding roll being visible in FIG. 3.

In a manner similar to that of the device shown in FIG. 1 the band is supplied by a power driven pair of rolls. The top roll of the said pair of rolls is visible in FIG. 3 and designated by the reference numeral 25. Located on the same shaft as roll 25 is a pinion 26 driven, by way of example, via a driving chain 27 and a pinion 28, by means of a motor 29 of which the speed is adjustable. This feeding device or transporting means unwinds the band 23 from the reel 22 and inserts it in the subsequent shaping mechanism.

Figure 4:
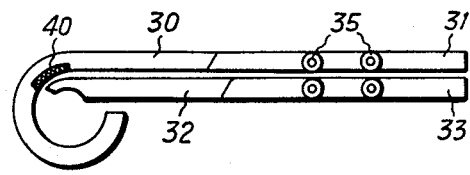
FIG. 4 is a side view of the guide members of the device according to FIG. 3.
Figure 5:
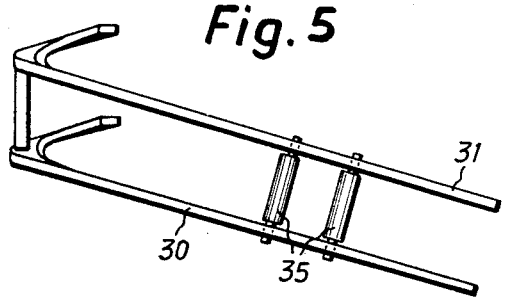
FIG. 5 is a perspective view of the guide members of the device according to FIG. 3.

In the embodiment of the invention according to FIG. 3 the shaping mechanism comprises two pairs of guide rails 30 and 32, and 31 and 33, guide rails 30, 31 forming outer guide rail means and guide rails 32, 33 inner guide rail means. The shape of these guide rails is shown in greater detail in FIGS. 4 and 5. The rails consist of straight inlet portions followed by helically curved forming portions. The two rails forming one pair are disposed in spaced relationship corresponding to the thickness of the band 23 processed.

Contrary to the device according to FIG. 1 the guide rails of a pair are not laterally interconnected. For the lateral guidance of the band, rolls or abutment means 34 are provided to ensure that the band is passed into the shaping mechanism in such a manner that the right-hand edge of the inserted band as seen in FIG. 3 is located immediately adjacent the left-hand edge of the preceding coil. As shown in the drawing, rollers 35 may be provided between the guide rails in order to reduce friction.

The band shaped into a tube by means of the shaping mechanism disclosed then reaches a welding device diagrammatically shown at 37. The adjacent helical edges of the band are there welded together in a manner known per se. If necessary, the tube produced in this manner may be hardened and/or annealed in a device 38 provided behind the welding device. The tube emerging from the complete unit will therefore not require further processing and can be used direct.

It is readily appreciated that the complete device may be changed over from one tube size or tube diameter to another by changing the four guide rails 30, 31, 32 and 33. As the outer guide rails 30 and 31 need extend over only a three-quarter turn or less in the curved portion while about a quarter-turn or less will suffice in the inner guide rails 32 and 33, the guide rails are relatively light and correspondingly easy to handle when being exchanged.

The guide rails according to this invention cause only negligible friction with the band and are therefore not subject to excessive wear. Subject to the comparatively greatest wear are those portions of the two guide rails which form the first bend in the band supplied, i.e. the first curved portions of the two outer rails. A recess is preferably provided at these points in the outer guide rails to accommodate an insert 40 (FIG. 4) made of a harder metal. This insert 40 in the two outer rails, preferably formed of a hard-metal alloy, can easily be replaced when worn while the rest of the rails can be used further.

When changing over from one tube size to another, it is possible for a different pitch angle (angle $\beta$ in FIG. 2) to enable more rational manufacture. In order to change the pitch angle, the supporting frame 21 with the reel, the guide rollers and the drive rolls is adjustably arranged in such a manner that it can be swivelled about the point A (FIG. 3). This swivelling movement automatically changes the pitch angle. Naturally the guide rails employed in any one case must be adapted to the pitch angle $\beta$. The frame 20 may be arranged on a turntable with the point A as its pivot in order to be swivellable. It may be provided with rollers; in this case, however, means must be provided to lock the frame on its base.

Figure 6:
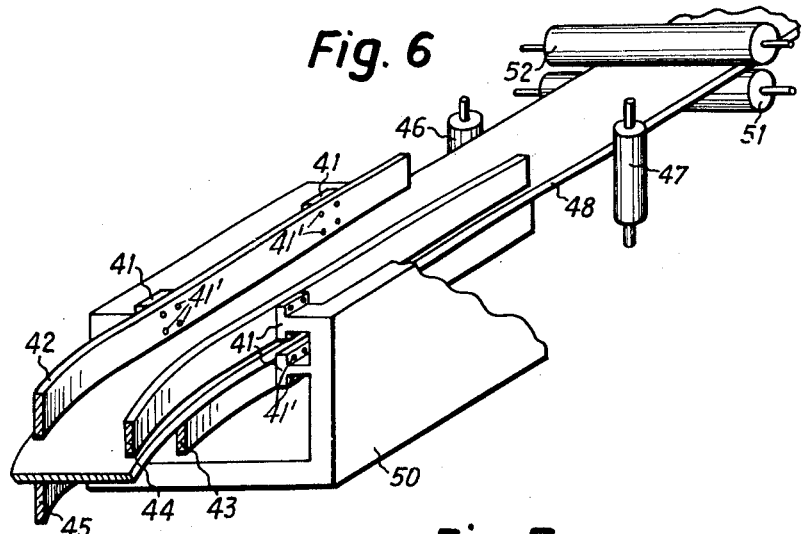
FIG. 6 shows a device designed to attach the guide members.

FIG. 6 shows the manner of attaching the guide rails in conjunction with a further embodiment. The frame 50 supporting the reel (not shown) with the band 48 to be processed and the driving rollers 51, 52 (not shown) is provided with flanges 41 on either side designed for the removal of the guide rails here designated by 42, 43, 44 and 45, which correspond to the guide rails 30, 31, 32 and 33 of the embodiment shown in FIGS. 3 through 5. In this embodiment the rails 42, 44 form the outer and the rails 43, 45 the inner guide rail means. The guide rails are attached to the flanges as by screws 41' indicated diagrammatically. It is readily seen that only a few simple manipulations are required to exchange the guide rails. FIG. 6 further shows the lateral guide rollers or abutment means 46, 47.

Figure 7:
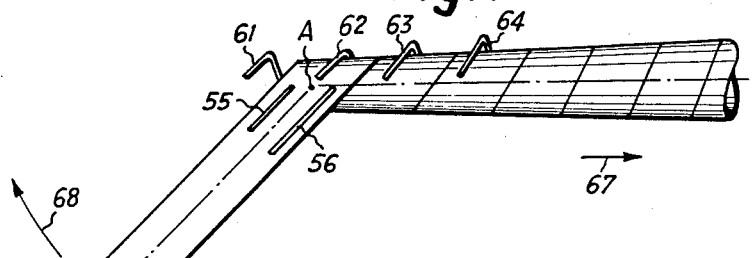
FIG. 7 is a diagrammatic view of a device for the manufacture of spirally welded conical tubes.

FIG. 7 shows diagrammatically the manufacture of conical tubes, i.e. of tubes with a continuously changing diameter.

Several curved guide rails 61, 62, 63 and 64 which are provided with an inner diameter larger towards the tube delivery are located on a mobile base independent of the horizontally disposed guide rails 65, 66. Movement is effected in the direction of the arrow 67. Swivelling the entire unit about point A causes the pitch angle to be changed. Co-ordination of the movement in the direction of the arrow 67 with the swivelling movement of the band supplied in the direction of the arrow 68 about point A enables a conical tube to be continuously produced in one operation.

Figure 8:
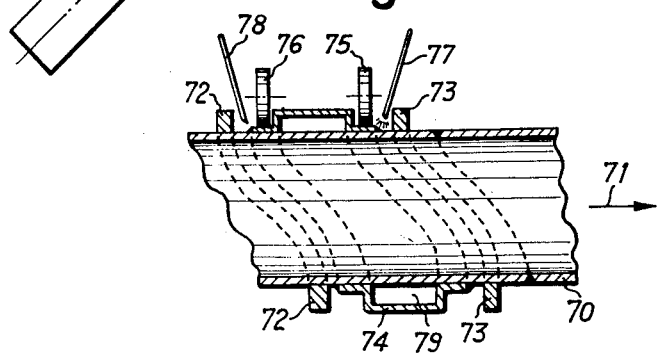
FIG. 8 is a diagrammatic view of a process for attaching section bands to the spirally welded tubes.

FIG. 8 shows how a heating or cooling duct can be continuously applied to a tube manufactured by means of the devices disclosed. The tube here designated by the numeral 70 leaves the forming and welding devices (not shown) in the direction of the arrow 71. Rolled on between the two forming rails 72 and 73 by means of the rolls 75 and 76 is a section band 74. The section is U-shaped and projecting flanges on either side rest on the surface of the tube 70. The section band 74 is preferably attached to the tube surface by welding, as by means of the welding electrodes 77 and 78. A channel 79 helically enclosing the tube is produced through which a cooling or heating medium for the tube or its contents can be passed.

Naturally a number of modifications is possible in the shown devices for the manufacture of spirally welded tubes. By way of example, the band may be inserted tangentially at the underside of the tube formed. The advantage of this embodiment resides in the fact that the interior of the tube produced is more readily accessible and that a welding seam can be more easily applied on the inside. If a welding seam is to be applied from both the outside and the inside, it is advisable to stagger the welding stations relatively to one another so that heating for the second welding operation results in a thermal tension release of the first operation. The inner welding operation is preferably performed first and subsequently, e.g. one turn of the band forming the tube afterwards, the welding operation at the outside of the tube.

The devices shown may be both stationary and mobile, i.e. mounted on vehicles or ships, the tubes then being continuously manufactured on site. When the device is arranged on vehicles, the tube is first placed on trestles while the vehicle moves along at the speed at which the tube is produced. The tube is then removed from the trestles in sections and lowered into the ditch into which it must be placed.

The devices disclosed enable bands to be formed into tubes made of a variety of materials. Apart from steel and metal tubes, adequate welding methods enable plastic tubes to be manufactured. Adjustment of the rails in respect of the guides enables laminated spiral tubes to be produced, the various laminations being formed of different materials. This makes it possible to produce tubes with a plastic lining in one operation, or to make metal-plated tubes. It is further possible to manufacture finned tubes in one operation, formed e.g. of flanged bands, where the fins are disposed parallel with the welding seam and spirally or helically around the tubes. When processing laminated or lining material for the manufacture of highly resistant and non-wearing tubes, such as tubes designed for the oil industry, for concrete conveyor tubes or pneumatic conveying tubes, the additional application of ring burners or induction and heating coils behind the guides for the improvement of the tubes enables manufacture including improvement to be performed in one operation.

Having now particularly described and ascertained the nature of my said invention and in what manner the same is to be performed, I declare that what I claim is:

1. In a machine for making a tube by spirally winding a band having parallel edges, in combination, transporting means for transporting the band in one direction; two pairs of stationary inner and outer guide rail means, said inner and outer guide rail means being spaced from each other a distance corresponding to the thickness of the band, said pairs of inner and outer guide rail means being transversely spaced across the width of the band so as to be located inwardly spaced from the longitudinal edges of the band, respectively, while defining a free space between themselves, said two pairs of inner and outer guide rail means having straight inlet portions extending in said direction to the region of said transporting means for receiving and slidably guiding a transported band, and said inner and outer guide rail means having helical forming portions respectively following said straight inlet portions and receiving the transported band from said inlet portions for slidably guiding and curving the transported band, said helical forming portions having a helix axis inclined to said one direction, said helical forming portions of said outer guide rail means extending at most through an angle of 270°, and said helical forming portions of said inner guide rail means extending at most through an angle of 90°; at least one abutment roller means located laterally of the guide rail means for supporting at least one edge of the transported band against forces acting in the direction of said helix axis whereby the transported band is spirally wound to form an empty tube; and welding means located spaced from said inlet portions in the direction of said helix axis for welding adajcent band edges of the newly formed tube.

2. A machine as set forth in claim 1 and including at least one pair of cooperating roller means having parallel axes transverse to said one direction, one roller means of the pair being turnably mounted between said inlet portions of said outer guide rail means, and the other roller means being turnably mounted between said inlet portions of said inner guide rail means, said cooperating roller means being adapted to engage the top and bottom faces of the transported band for guiding the same.

3. A machine as set forth in claim 1 wherein said helical forming portions directly follow said inlet portions of said inner and outer guide rails; wherein said forming portions of said outer guide rail means are formed with recesses on the inner side thereof adjacent said inlet portions, and including insets of a hard material in said recesses, said insets being adapted to be engaged by the first part of the band which is formed into curved shape.

References Cited in the file of this patent

UNITED STATES PATENTS

| | | |
|---|---|---|
| 519,182 | Gould | May 1, 1894 |
| 1,417,050 | Fentress | May 23, 1922 |
| 1,471,057 | Phillips | Oct. 16, 1923 |
| 1,659,754 | Thorsby | Feb. 21, 1928 |
| 1,659,792 | Thorsby | Feb. 21, 1928 |
| 1,689,374 | Williams | Oct. 30, 1928 |
| 1,788,220 | Williams | Jan. 6, 1931 |
| 2,018,477 | Wentz | Oct. 22, 1935 |
| 2,136,942 | Freeze | Nov. 13, 1938 |
| 2,282,176 | Fay et al. | May 5, 1942 |
| 2,794,409 | Freeze | June 4, 1957 |
| 2,899,921 | Nicolaisen | Aug. 18, 1959 |

FOREIGN PATENTS

| | | |
|---|---|---|
| 1,056,320 | France | Oct. 21, 1953 |